United States Patent [19]
Yoshikawa

[11] Patent Number: 6,142,114
[45] Date of Patent: Nov. 7, 2000

[54] INTAKE STRUCTURE OF AN INTERNAL COMBUSTION ENGINE

[75] Inventor: Yuji Yoshikawa, Hamamatsu, Japan

[73] Assignee: Suzuki Motor Corporation, Hamamatsu, Japan

[21] Appl. No.: 09/316,889

[22] Filed: May 21, 1999

[30] Foreign Application Priority Data

May 30, 1998 [JP] Japan ................................. 10-166064

[51] Int. Cl.[7] ............................................. F02M 35/104
[52] U.S. Cl. ................................. 123/184.42; 123/184.47
[58] Field of Search ........................ 123/184.42, 184.47, 123/184.24, 184.34

[56] References Cited

U.S. PATENT DOCUMENTS 4,867,110  9/1989  Distelrath ........................... 123/183.42
5,657,727  8/1997  Uchida ............................... 123/184.47
5,954,021  9/1999  Yuunaga ............................. 123/184.42

FOREIGN PATENT DOCUMENTS

| 56-501056 | 7/1981 | Japan . | |
|---|---|---|---|
| 405010220 | 1/1993 | Japan | ............... 123/184.42 |
| 05065857 | 3/1993 | Japan . | |
| 06081735 | 3/1994 | Japan . | |
| 08121273 | 5/1996 | Japan . | |
| 09004541 | 1/1997 | Japan . | |
| 09070720 | 3/1997 | Japan . | |
| 09177623 | 7/1997 | Japan . | |

*Primary Examiner*—Marguerite McMahon
*Attorney, Agent, or Firm*—Flynn, Thiel, Boutell & Tanis, P.C.

[57] ABSTRACT

An improved intake structure of an internal combustion engine intended to attain a reduction of weight and improve engine performance. A mounting flange and a surge tank are integrally formed as a manifold constituent, and branch pipes are formed separately from the manifold constituent.

17 Claims, 9 Drawing Sheets

UPWARD

UPWARD

INTAKE STRUCTURE OF AN INTERNAL COMBUSTION ENGINE

FIELD OF THE INVENTION

The present invention relates to an intake structure of an internal combustion engine for a vehicle and more particularly to an intake structure of an internal combustion engine provided with an intake manifold and intake system components.

BACKGROUND OF THE INVENTION

In an internal combustion engine of a vehicle there are provided an intake manifold for conducting intake air to cylinders and intake system components such as a throttle body.

More particularly, reference is here made to FIGS. 11 and 12. In both figures, the numeral 102 denotes an internal combustion engine with plural cylinders (i.e., four cylinders), the engine being mounted on a vehicle, and wherein 104 denotes a cylinder block, 106 denotes a cylinder head, 108 a cylinder head cover, and 110 an oil pan.

In the cylinder block 104 there is supported a crank shaft 114 with a crank pulley 112 fixed thereto, and there are also mounted, as auxiliary devices, a water pump 118 provided with a water pump pulley 116 and an alternator 122 provided with an alternator pulley 120. A driving belt 124 is entrained on the crank pulley 112, water pump pulley 116 and alternator pulley 120.

An intake manifold 126 and an exhaust manifold 128 are mounted to the cylinder head 106.

The intake manifold 126 is an integrally cast combination of a mounting flange 130 which is mounted to a side face of the cylinder head 106, a plurality of branch pipes 132 corresponding to the number of cylinders, and a surge tank 134 which suppresses intake pulsation.

A throttle body 136 is attached to one end face of the surge tank 134. It follows that the surge tank 134 and the throttle body 136 are located at upper positions of the branch pipes 132 which are curved and extend upward from the mounting flange 130.

As shown in FIGS. 13 and 14, the internal combustion engine 102 is supported elastically by left and right elastic mount members 138, 140 located on a principal axis of inertia G which is a central axis of inertia acting during operation of the engine 102, and forces acting in inertial directions are borne elastically by front and rear elastic mount members 144, 146 located on a member 142 which is disposed in the longitudinal direction (i.e., direction of movement) of the vehicle.

Known intake structures for use in such an internal combustion engine are disclosed, for example, in Japanese Patent Laid-Open Nos. 5-65857, 56-501056, 6-81735, 9-177623, 9-70720, 8-121273 and 9-4541.

In the intake structure disclosed in Japanese Patent Laid-Open No. 5-65857, an intake manifold is supported by an internal combustion engine through a stay member or brace. In the intake structure disclosed in Japanese Patent Laid-Open No. 56-501056, branch pipes are each formed in a predetermined curved shape to ensure both a required space and a length of the pipe. In the intake structure disclosed in Japanese Patent Laid-Open No. 6-81735, intake system components and branch pipes are formed as an integral structure to afford an advantage in point of space and attain a compact construction. In the intake structure disclosed in Japanese Patent Laid-Open No. 9-177623, a flange portion and branch pipes are formed of different materials to improve productivity. In the intake structure disclosed in Japanese Patent Laid-Open No. 9-70720, an intake manifold is constituted by a combination of composite materials to attain the reduction of weight for example. In the intake structure disclosed in Japanese Patent Laid-Open No. 8-121273, a mounting flange and a surge tank are formed by aluminum casting, while branch pipes are formed using iron, to avoid the occurrence of thermal strain for example. In the intake structure disclosed in Japanese Patent Laid-Open No. 9-4541, a resonator is disposed in a longitudinal direction of a fuel pipe and in proximity to the fuel pipe to prevent the transfer of heat from the internal combustion engine to the fuel.

In the conventional internal combustion engine intake structures, since heavy components such as a surge tank and a throttle body are disposed at upper positions of branch pipes not having a support rigidity, which positions are spaced apart from the principal axis of inertia G, vibrations are apt to occur in such heavy components during operation of the engine, which vibrations also exert a bad influence on electronic parts for example.

In the case where a support member such as a stiffener is used for improving the support rigidity of the surge tank and the throttle body, this results in an increase in the number of parts, in weight and in cost.

Moreover, the intake structure disclosed in above-mentioned Patent Laid-Open No. 5-65857 requires a large stay member; the one disclosed in above-mentioned Patent Laid-Open No. 56-501056 is disadvantageous in that since the surge tank used therein is disposed at an upper position, vibrations are apt to occur, weight is heavy and the freedom of layout is low; the one disclosed in above-mentioned Patent Laid-Open No. 6-81735 is disadvantageous in that since the surge tank used therein extends in the longitudinal direction of the internal combustion engine, not only an increase in size results, but also the distribution of air to cylinders is apt to become non-uniform; the intake structures disclosed in above-mentioned Patent Laid-Open Nos. 9-177623, 9-70720 and 8-121273 require a stay member for supporting the throttle body; and the one disclosed in above-mentioned Patent Laid-Open No. 9-4541 is disadvantageous in that the use of a resonator causes an increase in size.

SUMMARY OF THE INVENTION

To eliminate or at least minimize the above-mentioned inconveniences, in an intake structure of an internal combustion engine provided with an intake manifold, the intake manifold comprising a mounting flange which is mounted to the internal combustion engine, a plurality of branch pipes corresponding to cylinders and a surge tank, the present invention is characterized in that the mounting flange and the surge tank are integrally formed as a manifold constituent and the branch pipes are formed separately from said manifold constituent.

In the present invention, since the mounting flange and the surge tank are integrally formed as a manifold constituent and the branch pipes are formed separately from the said manifold constituent, it is not necessary for the branch pipes to support the surge tank and the throttle body. Therefore, it is possible to form the branch pipes of a material which is different from the material of the manifold constituent and dispense with a support member for supporting the surge tank and throttle body. Consequently, it is possible to attain a reduction in weight and in the number of parts used, increase the freedom for layout and length of branch pipes, and improve the engine performance.

DETAILED DESCRIPTION

Figure 1:
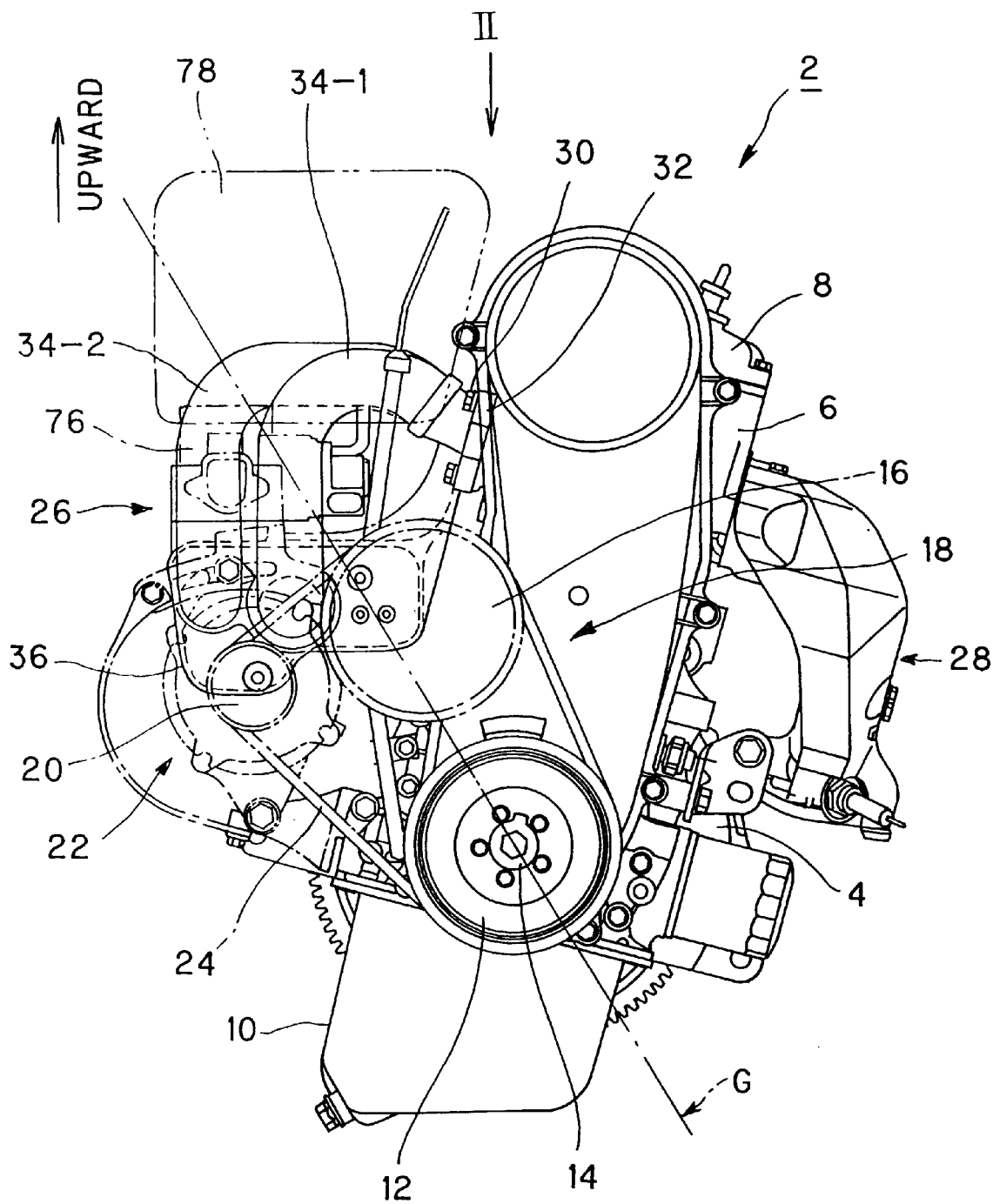
FIG. 1 is a front view of an internal combustion engine.
Figure 2:
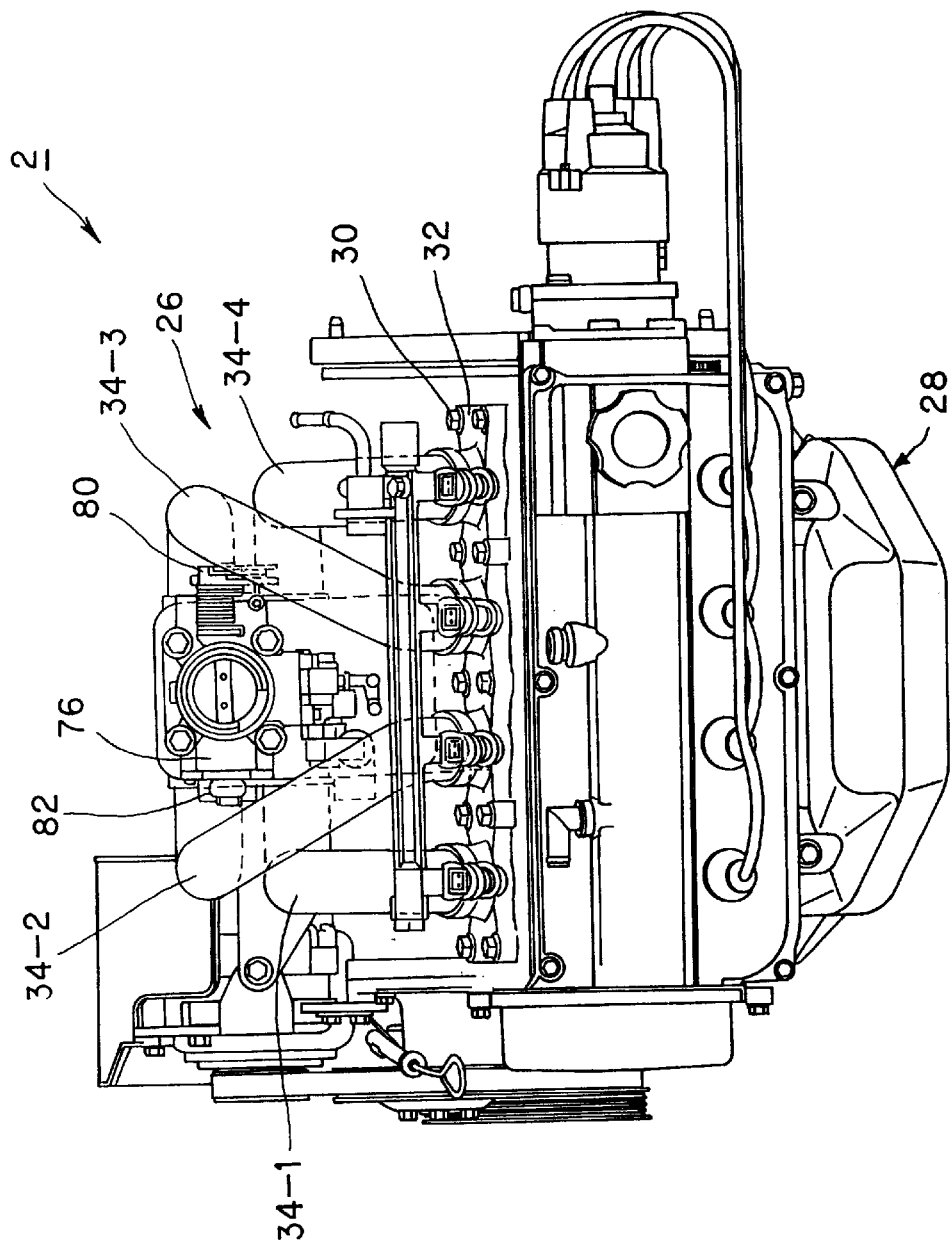
FIG. 2 is a plan view of the engine as seen in the direction of arrow II in FIG. 1.

An embodiment of the present invention will now be described in detail with reference to FIGS. 1–10. In FIGS. 1 and 2, the numeral 2 denotes an internal combustion engine with plural cylinders (i.e., four cylinders), the engine being mounted on a vehicle, and wherein 4 denotes a cylinder block, 6 a cylinder head, 8 a cylinder head cover, and 10 an oil pan.

In the cylinder block 4 there is supported a rotatable crank shaft 14 with a crank pulley 12 fixed thereto, and there are also provided, as auxiliary devices, a water pump 18 having a water pump pulley 16 and an alternator 22 having an alternator pulley 20. A driving belt 24 is entrained on the crank pulley 12, water pump pulley 16 and alternator pulley 20.

An intake manifold 26 and an exhaust manifold 28 are attached to the cylinder head 6.

The intake manifold 26 comprises a mounting flange 32 which is secured to the cylinder head 6 with manifold mounting bolts 30, first to fourth branch pipes 34-1 to 34-4 respectively corresponding to cylinders, and a surge tank 36 which suppresses intake pulsation.

In this embodiment, the mounting flange 32 and the surge tank 36 are formed integrally as a monolithic manifold constituent 38 by casting, while the branch pipes 34 are separately formed using a material which is different from the material of the manifold constituent 38, for example, using an aluminum alloy or a synthetic resin.

Figure 3:
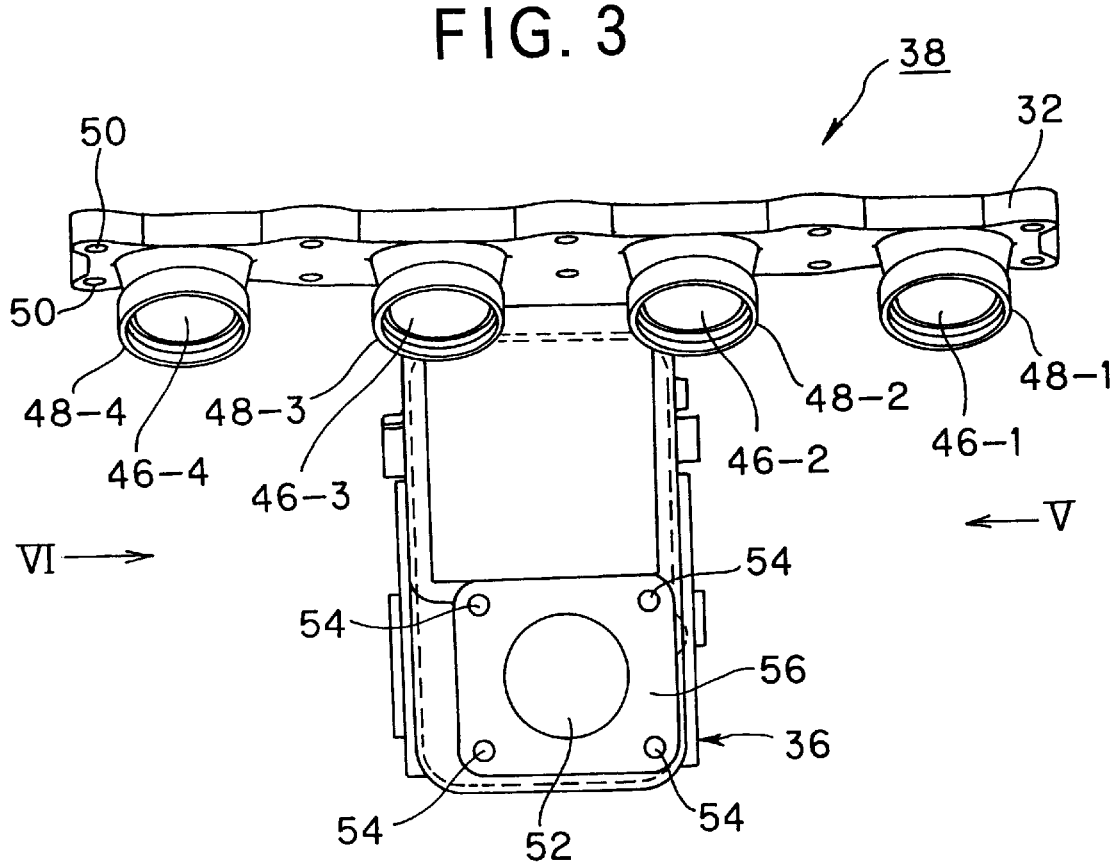
FIG. 3 is a plan view of a manifold constituent.
Figure 4:
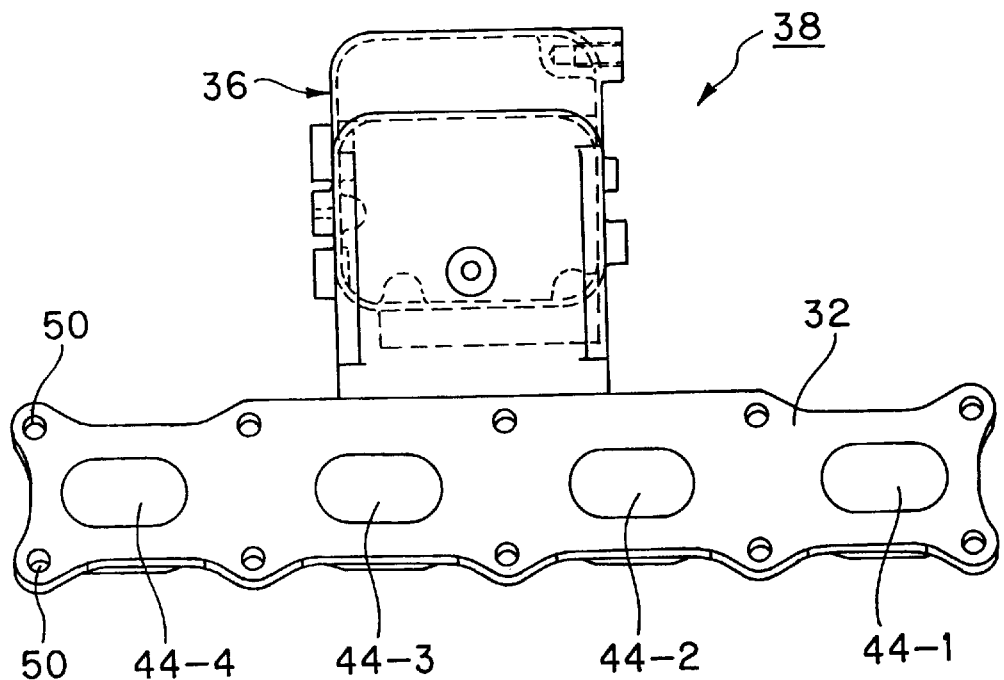
FIG. 4 is a bottom view thereof.

In the manifold constituent 38, as shown in FIGS. 3 to 6, the mounting flange 32 which is in the shape of a generally rectangular plate and the surge tank 36 which is in the shape of a hollow box, are integrally formed in a generally T shape in a plan view of FIG. 3 by being connected through a curved stay portion 40. Thus, the surge tank 36 is positioned away or spaced from the mounting flange 32.

Figure 5:
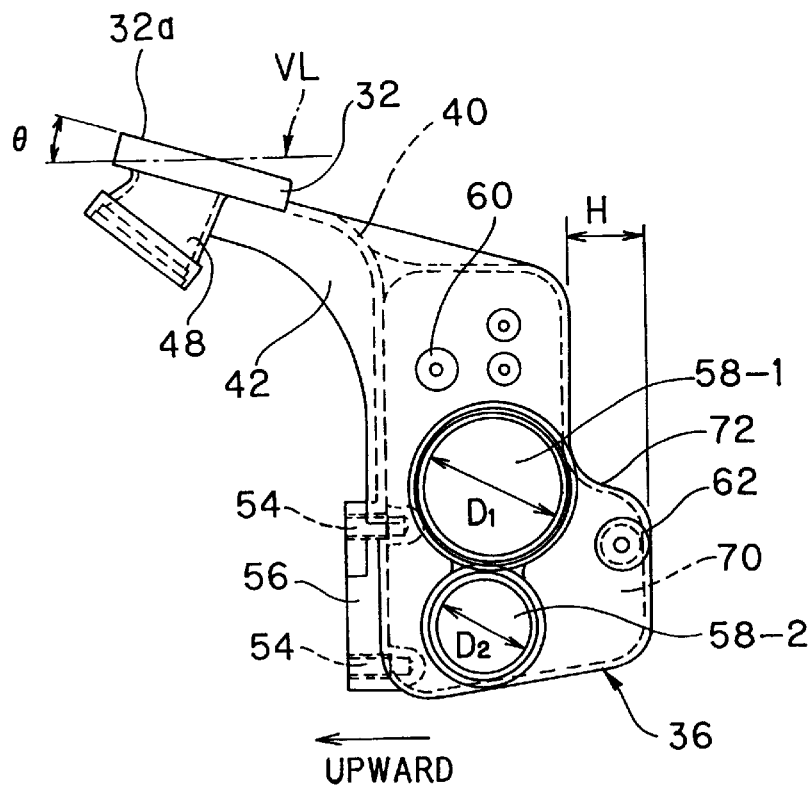
FIG. 5 is a right side view of the manifold constituent as seen in the direction of arrow V in FIG. 3.

As shown in FIG. 5, a joint surface 32a of the mounting flange 32 is inclined at a predetermined angle Θ relative to a horizontal line VL so as to match and mount on a side face of the cylinder head 5.

Ribs 42 extend from the mounting flange 32 up to the surge tank 36 along both sides or edges of the stay portion 40. The ribs 40 project transversely to form the stay 40 or to strengthen the stay.

First to fourth flange openings 44-1 to 44-4 (FIG. 4) are formed in the mounting flange 32 uniformly spaced longitudinally therealong. The mounting flange 32 is also provided with first to fourth tubular pipe connecting portions 48-1 to 48-4 correspondingly to the first to fourth flange openings 44-1 to 44-4. The pipe connecting portions 48-1 to 48-4 are formed with first to fourth connecting ports 46-1 to 46-4, respectively. Further a plurality of mounting bolt holes 50 for insertion therethrough of the manifold mounting bolts 30 are formed in the mounting flange 32. As an example, the flange openings 44 and the connecting ports 46 may be formed with an elliptic or oblong cross-sectional shape.

As shown in FIG. 3, the surge tank 36 is provided with a flat throttle body mounting seat 56 at a position spaced a long distance from the mounting flange 32. An upward air intake opening 52 and body mounting holes 54 are formed in the throttle body mounting seat 56.

As shown in FIG. 5, in one side face of the surge tank 36 where the first and second pipe connecting portions 48-1, 48-2 are position, there are formed a first pipe insertion opening 58-1 having a predetermined first inside diameter $D_1$ and a second pipe insertion opening 58-2 having a second inside diameter $D_2$ smaller than the first inside diameter $D_1$. Further, a boss 60 for mounting a union which is for taking out a negative pressure, as well as another boss 62, are formed on the said one side face of the surge tank.

Figure 6:
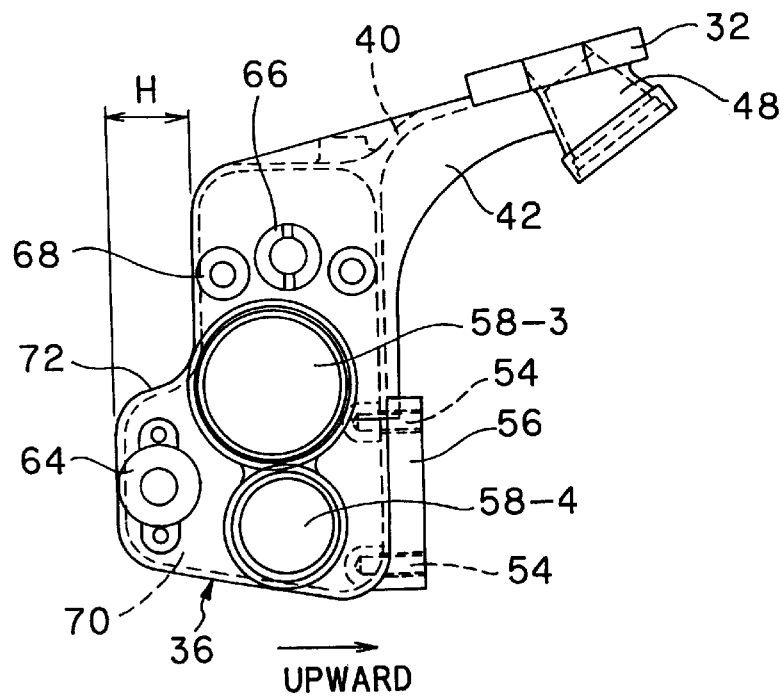
FIG. 6 is a left side view of the manifold constituent as seen in the direction of arrow VI in FIG. 3.

Likewise, as shown in FIG. 6, in the other side or opposite side face of the surge tank 36 where the third and fourth pipe connecting portions 48-3, 48-4 are positioned, there are formed a third pipe insertion opening 58-3 which is the same as the first pipe insertion opening 58-1 and a fourth pipe insertion opening 58-4 which is the same as the second pipe insertion opening 58-2. Further a sensor mounting seat 64 and a union mounting boss 66 are formed on the said other side face of the surge tank. The sensor mounting seat 64 is disposed between the third and fourth pipe insertion openings 58-3, 58-4 and on an opposite side thereof relative to the throttle body mounting seat 56.

In the lower portion of the surge tank 36 there is formed a stepped portion 72 (FIG. 6) which projects downwardly through a distance or height H. The stepped portion 72 defines an interior air flow space 70 for the flow of air introduced from the air intake opening 52.

As shown in FIGS. 7–10, the first to fourth branch pipes 34-1 to 34-4 are respectively disposed between the first to fourth pipe connecting portions 48-1 to 48-4 and the first to fourth pipe insertion openings 58-1 to 584, and are disposed opposedly with respect to the throttle body mounting seat 56.

Figure 9:
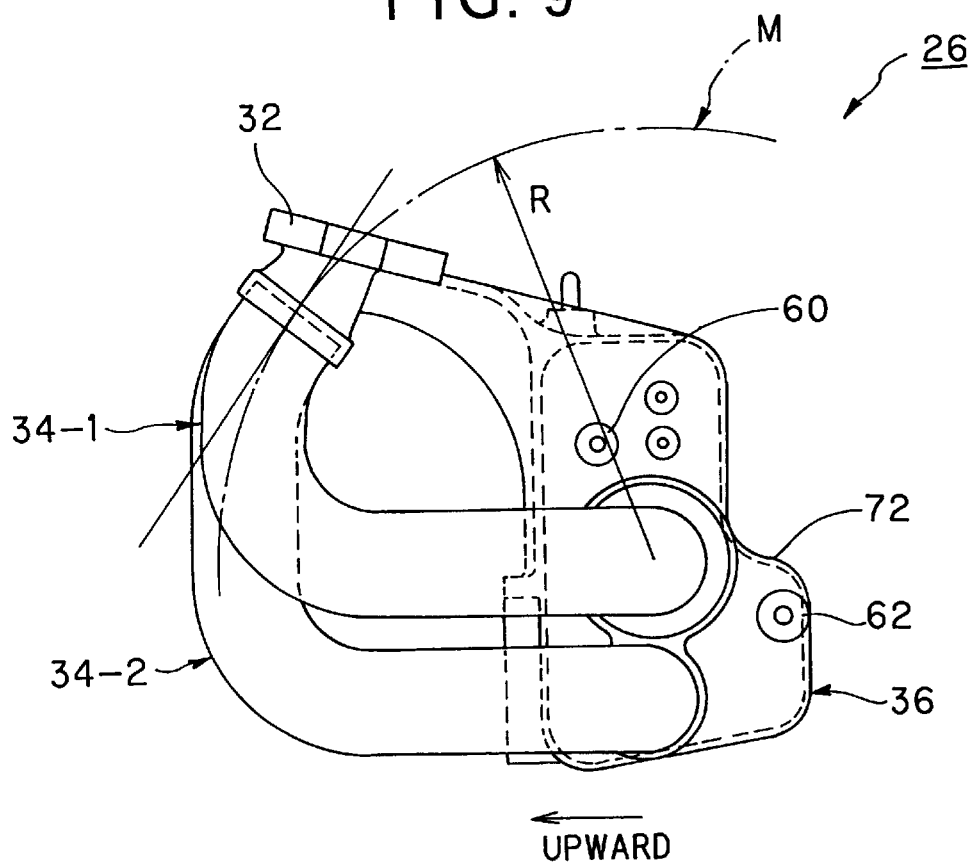
FIG. 9 is a right side view of the intake manifold as seen in the direction of arrow IX in FIG. 7.
Figure 10:
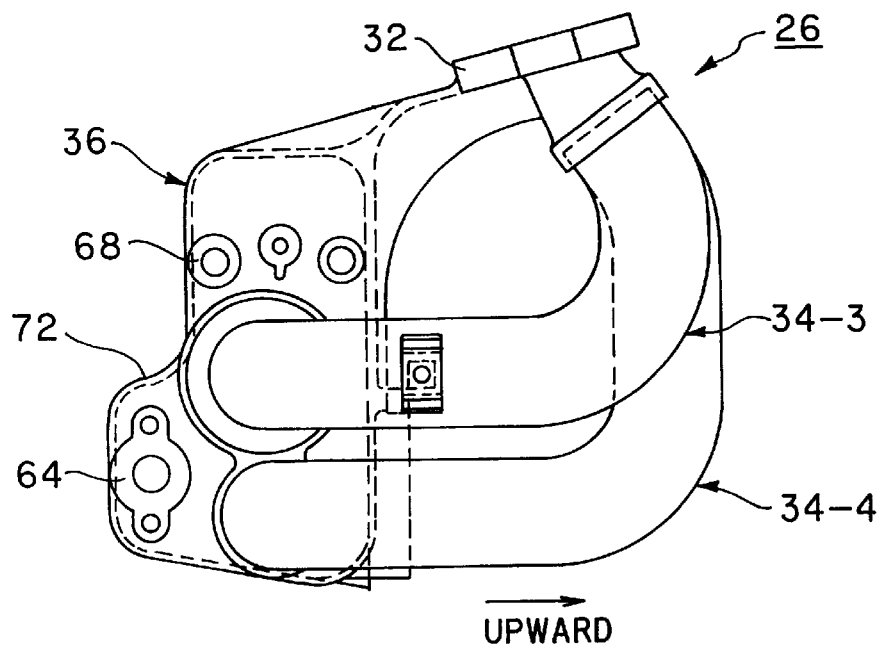
FIG. 10 is a left side view of the intake manifold as seen in the direction of arrow X in FIG. 7.
Figure 11:
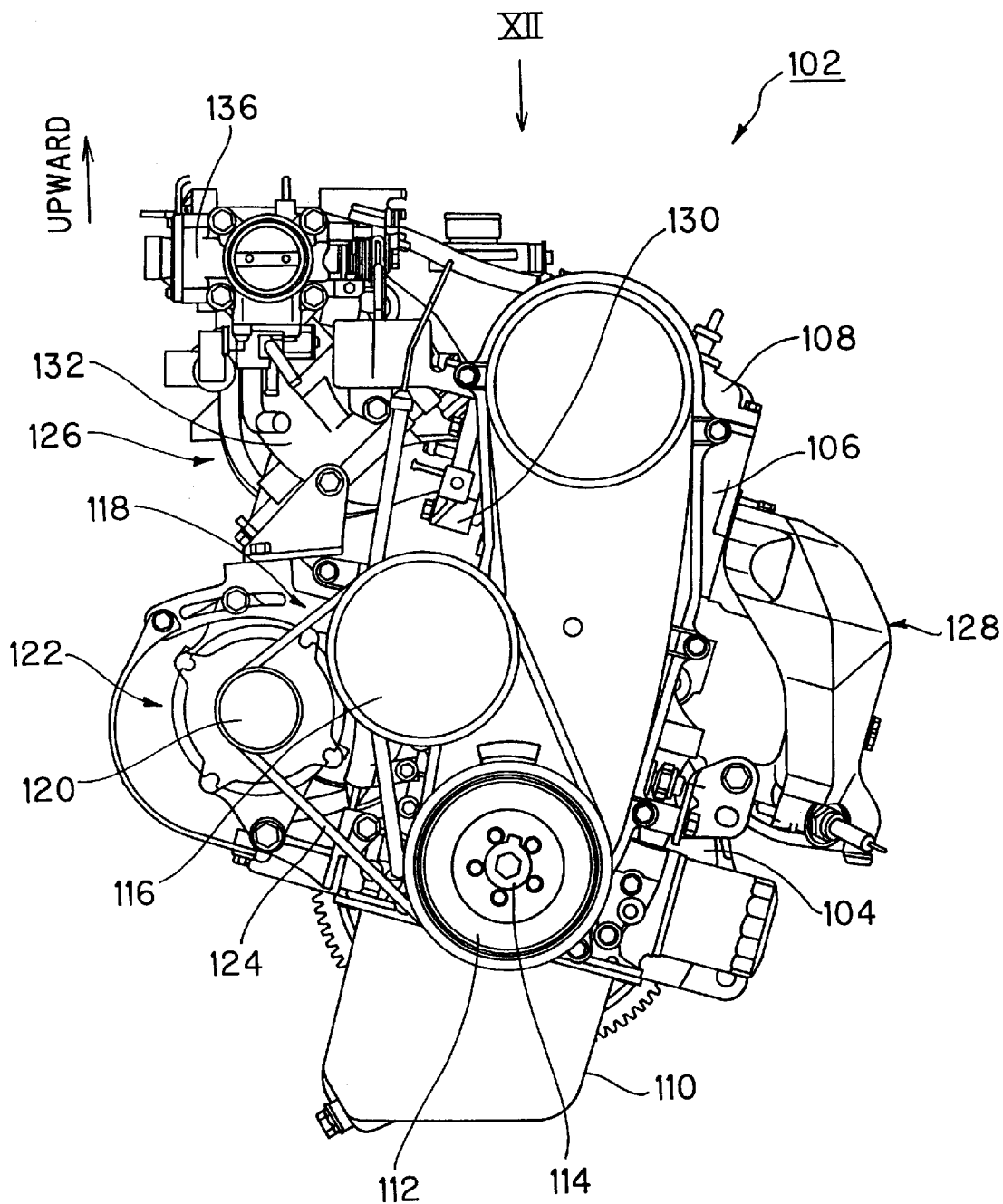
FIG. 11 is a front view of a conventional internal combustion engine.
Figure 12:
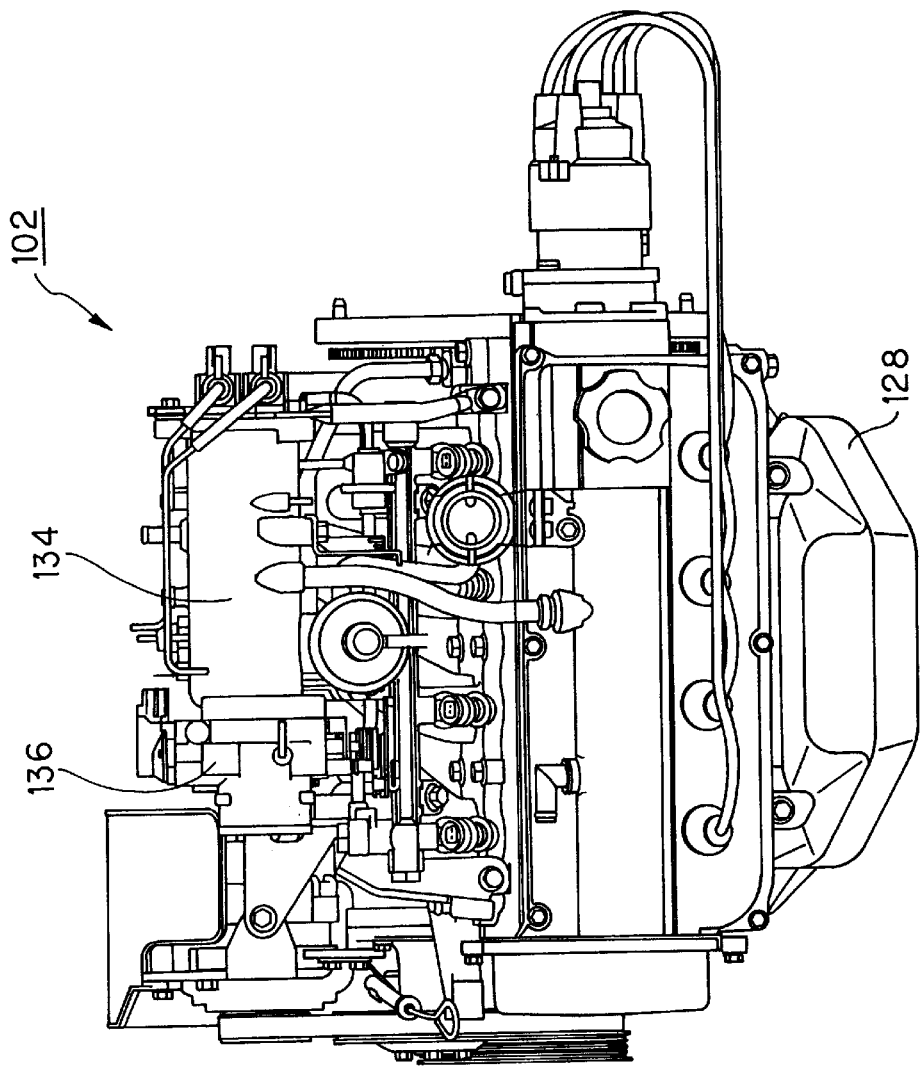
FIG. 12 is a plan view thereof as seen in the direction of arrow XII in FIG. 11.
Figure 13:
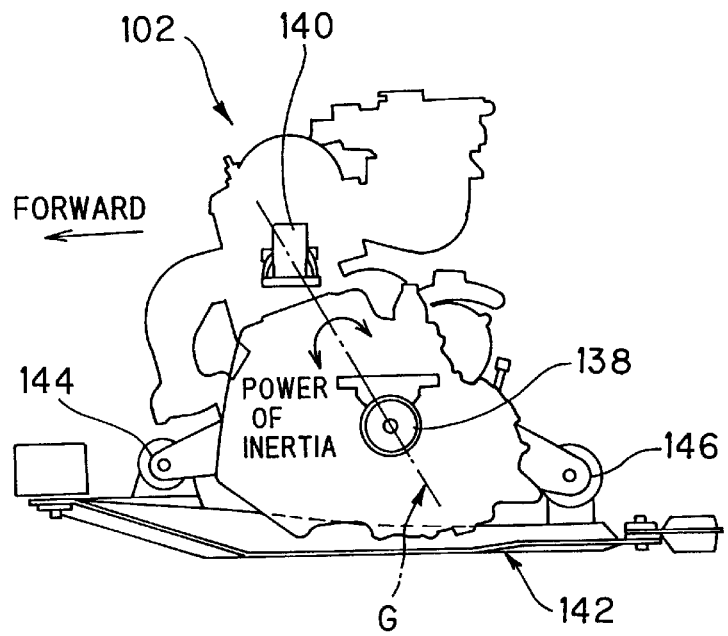
FIG. 13 is a schematic construction diagram of the conventional internal combustion engine, explaining a principal axis of inertia.
Figure 14:
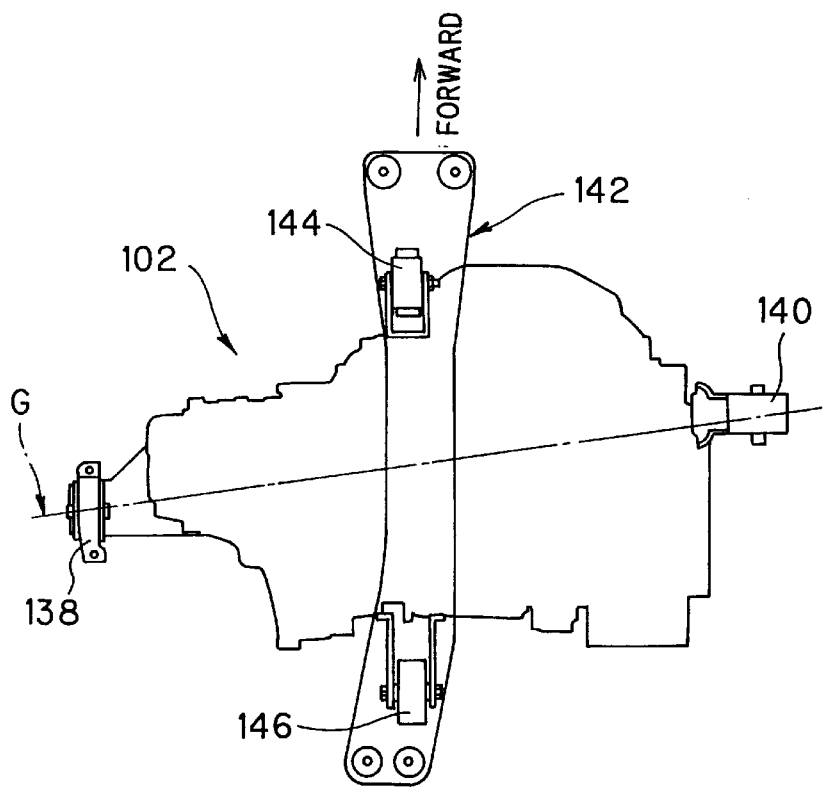
FIG. 14 is a bottom view showing in what state the internal combustion engine is supported.

The first branch pipe 34-1 comprises a first pipe end portion 34-1a located adjacent the surge tank 36 and a second opposite pipe end portion 34-1b located adjacent the mounting flange 32, which pipe end portions are fixedly connected with each other. The first pipe end portion 34-1a is formed in a rectilinear shape perpendicularly to one side face of the surge tank 36, and it has a first end opening 74-1 inserted into the surge tank through the first pipe insertion opening 58-1, which end opening 74-1 is expanded in a horn or flared shape. The second pipe end portion 34-1*b* is curvedly formed and its end is connected to the first connecting portion 48-1 on the mounting flange 32. As shown in FIG. 9, the second pipe end portion 34-1*b* is formed in such a manner that the center of its end opening, where it joins to the mounting flange 32, faces in a tangential direction to a circle M drawn with a radius of R from the center of its opposite end opening as connected to the surge tank 36.

The second branch pipe 34-2 comprises a first pipe end portion 34-2*a* located adjacent the surge tank 36 and a second opposite pipe end portion 34-2*b* located adjacent the mounting flange 32, which pipe end portions are fixedly connected with each other. The pipe end portion 34-2*a* is formed in a rectilinear shape perpendicularly with respect to one side face of the surge tank 36, and it has a second end opening 74-2 located within the second pipe insertion opening 58-2. The end opening 742 is typically not expanded in a horn shape, and does not significantly project into the surge tank. The opposite pipe end portion 34-2*b* is curvedly formed and its end, where it joins to the mounting flange 32, is connected to the second connecting portion 48-2. The end of pipe portion 34-2*b* is formed similar to that of pipe portion 34-1*b* as described-above.

Since the third branch pipe 34-3 is of the same construction as the second branch pipe 34-2, an explanation thereof will be omitted. Also, as to the fourth branch pipe 34-4 an explanation thereof will be omitted because it is of the same construction as the first branch pipe 34-1.

The reason why the one pipe end portions of the branch pipes 34 are formed in a rectilinear shape (flat shape) perpendicularly to the surge tank 36 is because it is intended to avoid interference with an air cleaner 78 which will be described hereinafter.

As shown in FIG. 1, the intake manifold 26 is disposed near the principal axis of inertia G of the internal combustion engine 2. Likewise, near the principal axis of inertia G and without being supported by any other support member, the throttle body 76 is mounted on the throttle body mounting seat 56 located at the central position of the intake manifold 26. The air cleaner 78 is disposed above the intake manifold 26. Further, a throttle link 80 and a throttle sensor 82 are attached to the throttle body 76.

Thus, the intake manifold 26 comprising the manifold constituent 38 and the branch pipes 34 is formed in a generally rectangular (i.e., trapezoidal) shape as a whole and is disposed near the principal axis of inertia G. Also as to heavy components such as the throttle body 76 attached to the intake manifold 26, they are gathered near the principal axis of inertia G. The branch pipes 34 are disposed so as to surround sensors and in such a manner that their end portions located on the cylinder block 4 side are positioned on both end sides in the direction of the crank shaft 14 of the internal combustion engine 2. Further, below the throttle body 76 the branch pipes 34 are disposed oppositely to the surge tank 36.

Next, the operation of this embodiment will be briefly described below.

The mounting flange 32 of the intake manifold 26 is fixed to a side face of the cylinder head 6 with the manifold mounting bolts 30, whereby the intake manifold 26 is secured to the cylinder head 6.

At a nearly central position of the intake manifold 26 the throttle body 76 is disposed between the pairs of branch pipes 34-1, 34-2 and 34-3, 34-4.

The air cleaner 78 is disposed above the throttle body 76.

Since the branch pipes 34 are formed separately from one another and separately from the mounting flange 32 and the surge tank 36, and are not utilized for supporting the surge tank 36 and the throttle body 76 attached thereto, it is possible to reduce the wall thickness of the branch pipes 34 and hence reduce the weight thereof.

Since the branch pipes 34 can be formed using a material different from the material of the mounting flange 32 and surge tank 36, for example, using an aluminum alloy or a synthetic resin, the freedom of layout can be enlarged by changing the length and diameter of the branch pipes 34. Besides, it is also possible to cope with various internal combustion engines different in displacement and smooth the inner surfaces of the branch pipes 34, thereby allowing intake air to be introduced smoothly during a high-speed operation and thereby improving engine performance.

Since the whole of the intake manifold 26 is formed in a generally rectangular shape, the intake manifold 26 can be mounted to the internal combustion engine 2 in a compact space and the engine 2 can be installed easily in a vehicle.

Since the throttle body 76 is attached to the manifold constituent 38, it is not necessary to use any separate support member for supporting the throttle body 76, whereby it is possible to attain a reduction in the number of parts and a reduction of weight.

Since heavy intake system components, including the surge tank 36 and the throttle body 76, are disposed near the principal axis of inertia G, there is no fear that these components may violently vibrate, and therefore it is possible to avoid the exertion of a bad influence on electronic parts, for example.

Since the first and second branch pipes 34-1, 34-2 and the third and fourth branch pipes 34-3, 34-4 are disposed oppositely to each other with respect to the surge tank 36 and the throttle body 76, it is possible to diminish variations in the flow of air to the cylinders and make the air flow uniform for the cylinders, with consequent improvement of the engine performance. Besides, it is possible to diminish the space occupied by the branch pipes and thereby attain a reduction of size.

Since the branch pipes 34 are disposed around the surge tank 36, components located around the surge tank 36, such as the throttle link 80 and the throttle sensor 82, are enclosed and protected by the branch pipes 34 and are thereby prevented from being damaged or frozen. Improvement of appearance can also be attained.

Figure 7:
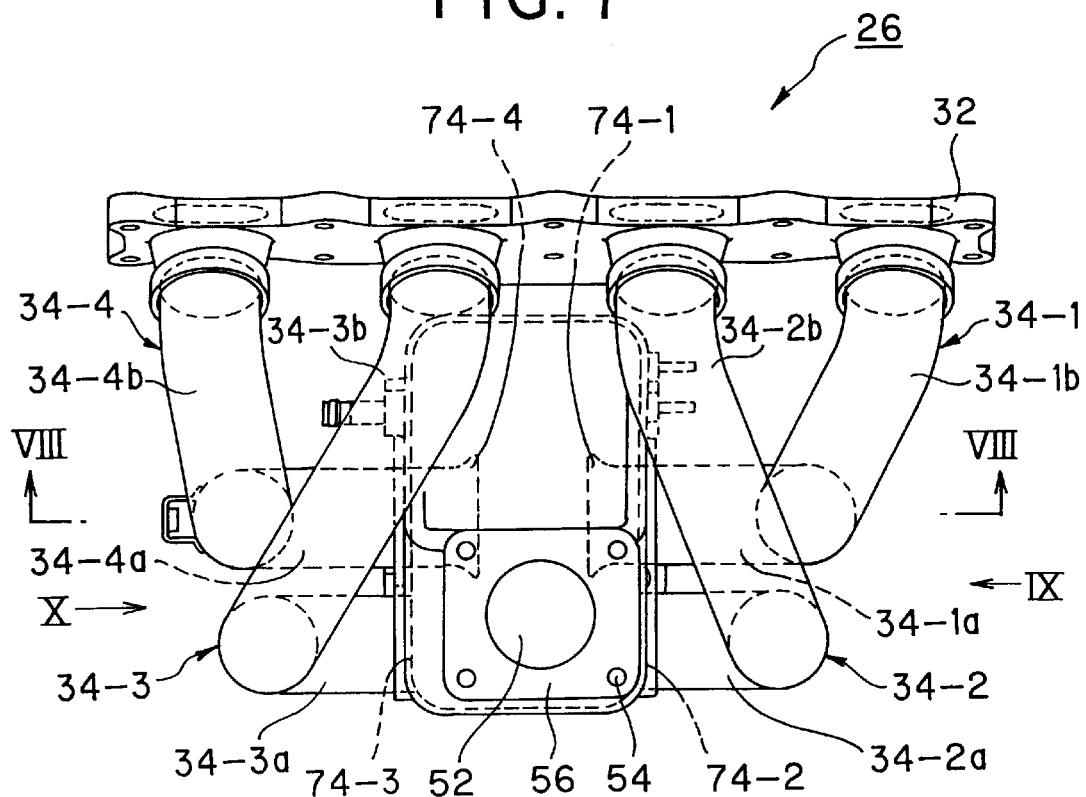
FIG. 7 is a plan view of an intake manifold.
Figure 8:
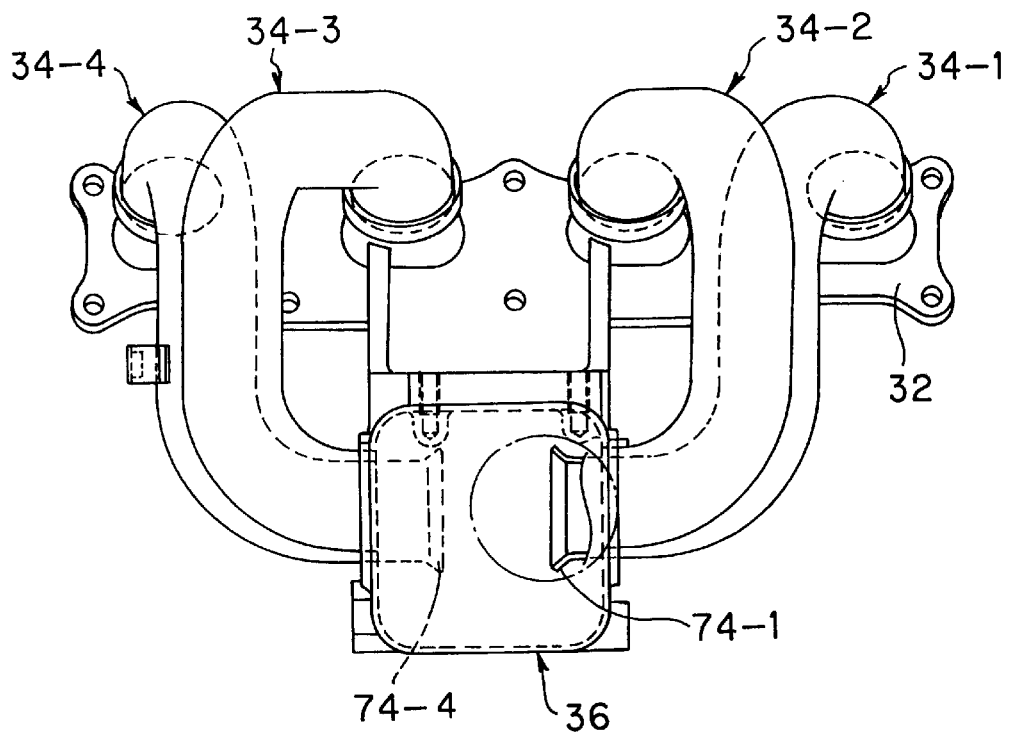
FIG. 8 is a sectional view taken on line VIII—VIII in FIG. 7.

Since the first and third end openings 74-1, 74-4 of the first and fourth branch pipes 34-1, 34-4 are extended into the surge tank 36, as shown in FIGS. 7–8 it is possible to render the branch pipes 34 equal in length and attain the reduction of size.

Since the manifold constituent 38 is formed in a generally T shape, a sufficient working space after assembly can be ensured around the surge tank 36.

Since the surge tank 36 and the throttle body 76 are spaced a long distance from the mounting flange 32, the branch pipes 34 can each be of a predetermined equal length.

Since the air flow space 70 is formed by the stepped portion 72 in the surge tank 36, the flow of air which has entered the surge tank 36 from the air intake opening 52 can be held in a predetermined state.

Since the center of the end opening of each branch pipe 34 faces in a tangential direction of a circle M of radius R on the mounting flange 32 side, not only the assembling performance of the branch pipes 34 is improved, but also the length of each branch pipe 34 can be adjusted easily.

Since the mounting flange 32 is provided with pipe connecting portions 48, the length of each branch pipe 34 or the length between each branch pipe 34 and the throttle body 76 can be adjusted easily. Besides, it is possible to install such components as fuel injection valves (not shown).

Since the surge tank 36 side of each branch pipe 34 is formed in a rectilinear shape perpendicularly to a side face of the surge tank 36, it is possible to avoid interference thereof with the air cleaner 78.

Since the end openings 74-1, 74-4 of the first and fourth branch pipes 34-1, 34-4 are expanded in a horn shape, it is possible to enlarge the mounting opening area.

According to the present invention, as will be apparent from the above description, the mounting flange and the surge tank are integrally formed as a monolithic one-piece manifold constituent and the branch pipes are individually formed separately from the manifold constituent, so the branch pipes are not required to have the function of supporting the throttle body. Therefore, the branch pipes can be formed using a material different from the material of the manifold constituent and it is possible to attain a reduction in weight and in the number of parts used. Moreover, the freedom of layout and the length for the branch pipes is increased. Thus, engine performance can be improved.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An intake structure for a vehicle internal combustion engine provided with plural cylinders, said intake structure comprising:

an elongate mounting flange adapted for securement to a side of the engine, said flange having at least four substantially parallel cylinder access openings extending therethrough in spaced relationship along an elongated direction thereof;

a hollow surge tank positioned in adjacent but sidwardly spaced relation from said mounting flange, said surge tank being positioned centrally of said flange in said elongated direction and having outwardly facing opposite end walls each having first and second openings extending therethrough along directions which are substantially parallel with said elongated direction, said surge tank having a length parallel with said elongated direction which is substantially less than the length of said mounting flange;

said cylinder access openings extending in parallel directions which are substantially perpendicular to the directions of the openings in said end walls of said surge tank;

a support brace extending sidwardly between and rigidly connected to said surge tank and a central portion of said mounting flange;

said mounting flange, said surge tank and said support brace being an integral one-piece monolithic manifold component having a generally T-shaped configuration;

first and second branch pipes having respective one ends thereof connected to adjacent first and second said cylinder access openings disposed adjacent one end of said mounting flange and respective other ends thereof connected to said first and second openings in one said end wall of said surge tank which is closest to said first and second cylinder access openings;

third and fourth branch pipes having respective one ends thereof connected to adjacent third and fourth said cylinder access openings disposed adjacent the other end of said mounting flange and respective other ends thereof connected to said first and second openings in said other end wall of said surge tank; and said first and second branch pipes being separable from said manifold component, and said third and fourth pipes also being separable from said manifold component and said first and second branch pipes.

2. An intake structure according to claim 1, wherein each of said first, second, third and fourth branch pipes is a separate one-piece member.

3. An intake structure according to claim 2, wherein said second and third cylinder access openings are positioned between said first and fourth cylinder access openings along said elongated direction, wherein said first and fourth branch pipes are substantially identical but mirror images of one another, and wherein said second and third branch pipes are substantially identical but mirror images of one another.

4. An intake structure according to claim 1, wherein said second and third cylinder access openings are positioned adjacent one another and between said first and fourth cylinder access openings, wherein said one end wall is generally sidewardly aligned with said second cylinder access opening, and wherein said other end wall is generally sidewardly aligned with said third cylinder access opening.

5. An intake structure according to claim 4, wherein only one of said first and second branch pipes, and only one of said third and fourth branch pipes, includes an elongate end portion which projects through the respective opening of the respective end wall into the interior of the surge tank.

6. An intake structure according to claim 5, wherein said elongate end portion terminates in a free end defined by an enlarged flared annular flange.

7. An intake structure according to claim 6, wherein each of said first, second, third and fourth branch pipes is a separate one-piece member.

8. An intake structure for a vehicle internal combustion engine provided with an intake manifold, said intake structure comprising:

a hollow surge tank positioned in sidewardly spaced relation to an elongate mounting flange, said surge tank having outwardly facing opposite end walls each having openings extending therethrough;

said elongate mounting flange adapted for securement to the engine, said mounting flange having at least four substantially parallel cylinder access openings extending therethrough in spaced relationship along the elongated direction thereof, said cylinder access openings being substantially perpendicular to openings in the end walls of said surge tank;

a support brace extending sidewardly between and rigidly connected to said surge tank and said mounting flange;

said mounting flange, said surge tank and said support brace being an integral one-piece monolithic manifold component; and branch pipes each having one end thereof connected to a respective one of said cylinder access openings and the other end thereof connected to a respective one of said openings of said surge tank, said branch pipes being separable from said manifold component.

9. An intake structure according to claim 8, wherein each of said branch pipes is a separate one-piece member.

10. An intake structure of an internal combustion engine according to claim 8, wherein said branch pipes are formed of a material different from the material of said manifold component.

11. An intake structure of an internal combustion engine according to claim 8, wherein said branch pipes are arranged so as to surround sensors.

12. An intake structure of an internal combustion engine according to claim 8, wherein the ends of said branch pipes connected to said surge tank include open end portions that extend into said surge tank.

13. An intake structure according to claim 8, wherein said integral one-piece monolithic manifold component has a T-shaped configuration.

14. An intake structure for an internal combustion engine, comprising:

- an elongate mounting flange adapted for securement to the internal combustion engine, said mounting flange having at least four substantially parallel cylinder access openings extending therethrough in spaced relationship along an elongated direction thereof;
- a hollow surge tank positioned in adjacent but sidewardly spaced relation from said mounting flange and defining therein a plurality of pipe openings, said surge tank being positioned centrally of said flange in said elongated direction;
- said mounting flange and said surge tank being fixedly joined as an integral one-piece monolithic manifold component having a T-shaped configuration; and
- a plurality of branch pipes each having one end thereof connected to a respective one of said cylinder access openings and the other end thereof connected to a respective one of the pipe openings in said surge tank.

15. An intake structure according to claim 14, wherein said surge tank has opposite end walls which are spaced apart in the elongated direction of said mounting flange, each said end wall having at least one said pipe opening therethrough, one of said branch pipes being connected to the pipe opening in one said end wall, another said branch pipe being connected to the pipe opening in the other said end wall.

16. An intake structure according to claim 14, wherein said surge tank includes opposite end walls which are spaced apart along said elongated direction of said mounting flange, each said end wall having first and second said pipe openings extending therethrough along directions that are substantially parallel with the elongated direction of the mounting flange, and a said branch pipe being connected to each of said pipe openings.

17. An intake structure according to claim 14, wherein the manifold component includes a stay joined sidewardly between said surge tank and a central portion of said mounting flange.

* * * * *